United States Patent

Markovitz et al.

(10) Patent No.: US 10,715,247 B2
(45) Date of Patent: Jul. 14, 2020

(54) DYNAMIC RECEIVER

(71) Applicant: Gilat Satellite Networks Ltd., Petah Tikva (IL)

(72) Inventors: Oren Markovitz, Raanana (IL); Dubi Lever, Hashmonaim (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 16/432,332

(22) Filed: Jun. 5, 2019

(65) Prior Publication Data

US 2019/0379448 A1 Dec. 12, 2019

Related U.S. Application Data

(60) Provisional application No. 62/681,348, filed on Jun. 6, 2018.

(51) Int. Cl.
*H04B 7/185* (2006.01)
*H04L 1/00* (2006.01)

(52) U.S. Cl.
CPC ....... *H04B 7/18582* (2013.01); *H04L 1/0036* (2013.01)

(58) Field of Classification Search
CPC .............. H04B 7/0417; H04B 7/18582; H04B 7/0452; H04B 7/0632; H04B 7/086; H04B 17/24; H04B 17/318; H04B 7/0871; H04B 7/0885; H04B 7/18515; H04L 1/0036; H04L 27/2647; H04L 27/2662; H04L 27/2695; H04L 5/0023
See application file for complete search history.

(56) References Cited

U.S. PATENT DOCUMENTS

| | | | | |
|---|---|---|---|---|
| 10,476,711 | B2 * | 11/2019 | Yoshimochi | H04L 5/0044 |
| 2006/0209749 | A1 * | 9/2006 | Blanz | H04L 1/0009 370/328 |
| 2006/0222118 | A1 * | 10/2006 | Murthy | H03G 3/3068 375/345 |
| 2006/0227812 | A1 * | 10/2006 | Vrcelj | H04L 25/0212 370/503 |
| 2008/0285693 | A1 * | 11/2008 | Wang | H04L 25/03133 375/355 |
| 2009/0070824 | A1 * | 3/2009 | Barroso | H04B 7/18515 725/67 |

\* cited by examiner

*Primary Examiner* — Khanh C Tran
(74) *Attorney, Agent, or Firm* — Banner & Witcoff, Ltd.

(57) ABSTRACT

A receiver is presented, such that the receiver may be configured to receive transmissions in accordance with a continuous waveform and to relock quickly on a received transmission when the transmitter is switched or a change in the waveform parameters is made. The receiver may be configured to support reception of a shared channel and/or of a channel allocated for SCPC usage and may be modified while used (e.g., dynamic SCPC). In addition, a satellite communication system is presented, the satellite communication system comprising at least one receiver in accordance with the above-described receiver. The satellite communication system may be configured to utilize the receiver's characteristics for at least the purpose of achieving a highly efficient return link channel.

20 Claims, 3 Drawing Sheets

DYNAMIC RECEIVER

CROSS-REFERENCE TO RELATED APPLICATIONS

This application claims priority to U.S. Patent Application No. 62/681,348, filed Jun. 6, 2018 and entitled "Dynamic Receiver," which is hereby incorporated by reference herein in its entirety.

FIELD OF THE INVENTION

Aspects of the disclosure pertain to the field of communication systems, particularly to satellite communication systems.

BACKGROUND

A satellite communication system often includes a satellite, a central earth station or a hub, and a plurality of terminals. The hub transmits data to the terminals over a forward link (FL) carrier signal and each terminal receives the FL signal and extracts the data destined to it. The terminals transmit data to the hub, usually over several return link (RL) channels, and the hub uses receivers for receiving the transmissions of the terminals.

The RL resources are often managed using one of two methods. In the first method, known as Single Channel per Carrier (SCPC), each terminal is assigned a channel on which it can continuously transmit (i.e. without interrupting the transmitted carrier). Continuous transmission allows use of very efficient waveforms. In the SCPC method, since the number of channels is the same as the number of terminals, the hub needs to use a receiver per terminal. In the second method, based either on Time Division Multiple Access (TDMA) or on Multi-Frequency TDMA (MF-TDMA), each terminal is assigned time intervals (timeslots) on a channel or on several channels (at different times), and the terminal transmits in bursts over the assigned timeslots. In the TDMA-based methods, since several terminals share a channel and the number of receivers the hub needs to use is in accordance with the number of channels, the hub needs fewer receivers than the number of terminals. On the other hand, since the transmissions are burst transmissions, the efficient waveforms used in the SCPC method are not usable with TDMA based methods.

The spectrum available for satellite communication is limited (e.g. about 750 MHz in Ku-band and about 2500 MHz in Ka-band, per polarization). To increase the capacity of satellite communication systems, the spectrum is reused through division of the service area into multiple beams or spot beams and employing a frequency reuse scheme. However, multiple hubs are also needed in order to support the tens, hundreds, and even thousands of spot beams. Using the conventional techniques (e.g. as described above) would result in requiring a very large number of hubs comprising huge amounts of equipment, thus dramatically increasing the cost of satellite communication systems.

One method for dividing or sharing the available spectrum between user beams is known as Beam Hopping. The beam hopping method is supported by the "Digital Video Broadcasting (DVB); Second generation framing structure, channel coding and modulation systems for Broadcasting, Interactive Services, News Gathering, and other broadband satellite applications; Part 2: DVB-S2 Extensions (DVB-S2X)", also known in short as the DVB-S2X standard (ETSI EN 302 307-2). In the beam hopping method, the satellite switches (practically instantaneously) the hub's feeder beam, which includes the FL carrier (and the associated RL channels), between several user beams (i.e., that service terminals), e.g., in a TDMA manner. This switching allows the hub to support a larger service area (i.e. more spot beams) using a given amount of equipment and dynamically adjust the capacity allotted to each user beam (e.g. by adjusting the switching intervals). Consequently, the FL carrier is present at each beam for only a fraction of the time (and the terminals may transmit to the hub only during that fraction of the time), making it necessary for the hub (and the terminals) to synchronize data transmission with the beam hopping pattern (i.e. transmit the right data at the right time). Perhaps equally important, to support beam hopping it is necessary for each terminal to maintain its FL receiver synchronized even when the FL carrier signal is not present, or quickly relock on the FL carrier signal when the FL carrier signal becomes present, to enable reception of the FL carrier signal without losing any data being transmitted. In a way, the beam hopping method requires the terminals to employ a burst receiver capable of receiving a waveform designed for continuous transmissions, e.g. such as the DVB-S2X waveform.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to a receiver configured to receive a continuous waveform (e.g., the DVB-S2X waveform) and to relock quickly on the continuous waveform when the transmitter of the waveform is switched or a change in the waveform parameters is made. The receiver may comprise a demodulator, a channel profiles storage and a controller, wherein the demodulator may be configured to utilize techniques for supporting beam hopping. The receiver may be configured to support at least two reception modes, a shared channel mode and a dynamic SCPC mode.

Aspects of the disclosure are directed to a satellite communication system, the satellite communication system comprising a hub and a plurality of terminals, and the hub further comprising at least one receiver in accordance with the receiver described in the paragraph preceding this one. The satellite system may be configured to support sharing a transmission medium (e.g. a RL channel) between the terminals in accordance with the reception modes supported by the at least one receiver. In some embodiments, the satellite communication system may be configured in accordance with the shared channel mode, e.g., to assign a RL channel to multiple terminals (of the plurality of terminals) in turns, and to utilize the receiver's characteristics for at least the purpose of achieving a dynamically assigned RL channel with an efficiency of a continuous waveform. In some embodiments, the satellite communication system may be configured in accordance with the dynamic SCPC mode, e.g., to assign at least one RL channel to a terminal, modify the RL channel frequency and/or bandwidth (RL channel attributes) while the RL channel may be assigned to the terminal. The satellite communication system may utilize the receiver's characteristics for at least the purpose of achieving a highly efficient dynamically assigned RL channel.

In some embodiments, the satellite system may be configured to support both modes of operations simultaneously, e.g., over different RL channels. In some embodiments, the satellite system may be configured to support both modes of operation simultaneously, e.g., over a same RL channel, wherein a change in attributes of a RL channel may be applied to a RL channel shared by multiple terminals.

Aspects of the disclosure are also directed to methods, software, and computer readable media for operating and configuring the satellite communication system comprising the at least one receiver.

BRIEF DESCRIPTION OF THE DRAWINGS

Figure 1:
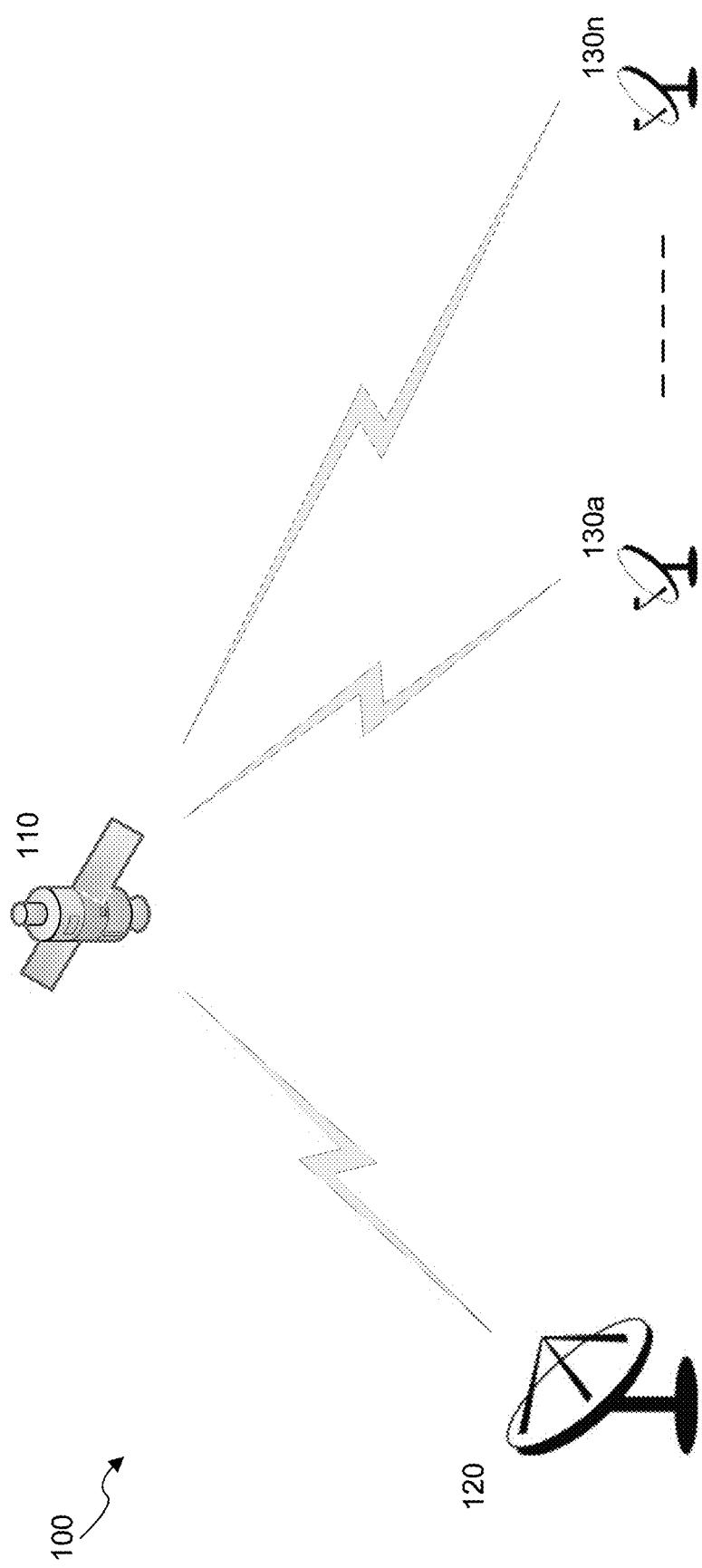

Having thus described the disclosure in general terms, reference will now be made to the accompanying drawings, which are not necessarily drawn to scale, and wherein:

FIG. 1 shows a satellite communication system in accordance with aspects of the disclosure.

Figure 2:
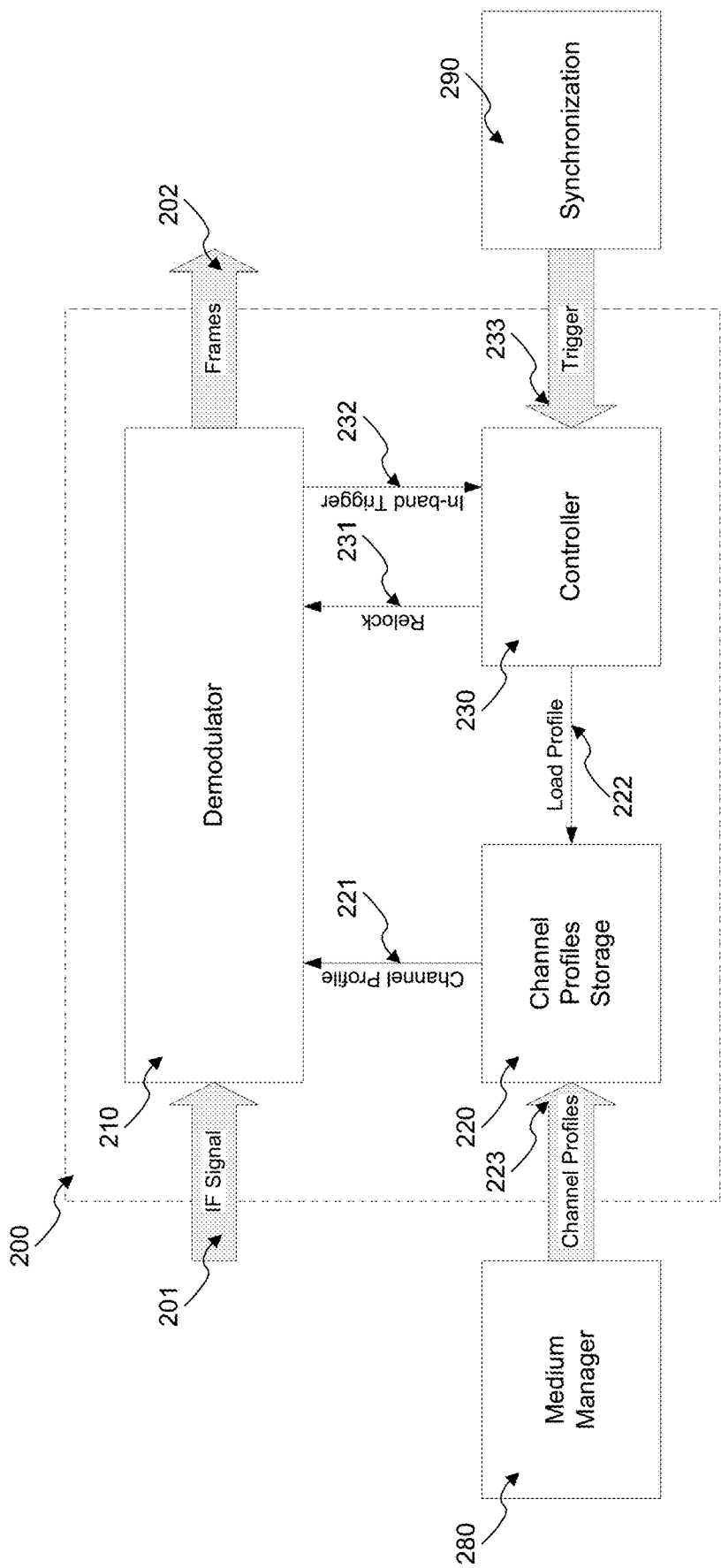

FIG. 2 shows a block diagram of a receiver in accordance with aspects of the disclosure.

Figure 3:
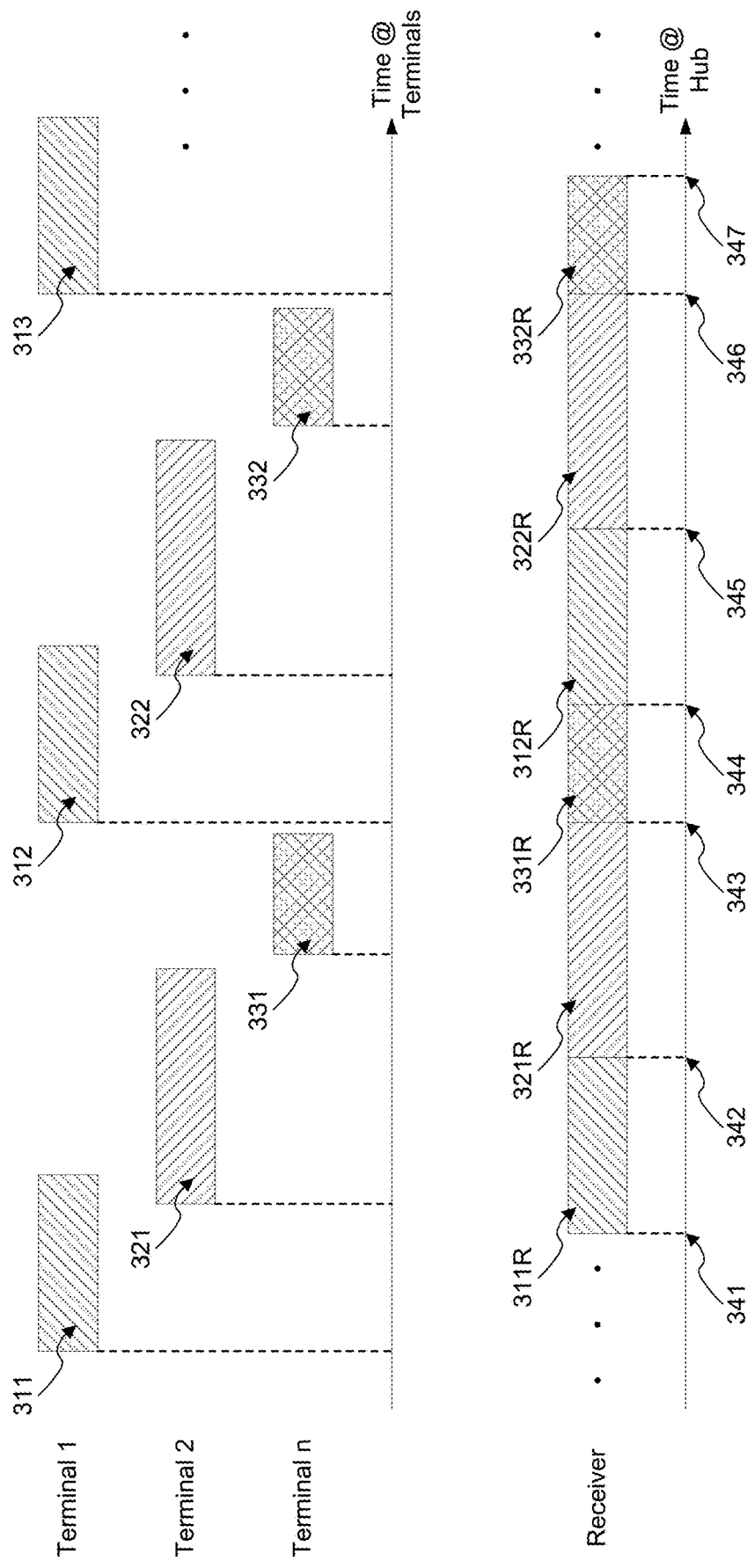

FIG. 3 shows a timing diagram in accordance with aspects of the disclosure.

DETAILED DESCRIPTION

In reference to FIG. 1, the satellite communication system 100 includes a satellite 110, a central earth station or a hub 120, and a plurality of terminals 130a-n. Considering the satellite communication system comprising the hub 120 and the plurality of terminals 130a-n, wherein the terminals 130a-n may be configured to transmit over a shared medium. In some embodiments, the shared medium may comprise a single channel and the hub may comprise a single receiver configured to receive the single channel. Yet, it shall be appreciated by any person skilled in the art that the description herein is similarly applicable to a shared medium comprising multiple channels, wherein the hub may comprise multiple receivers for receiving the multiple channels.

In some embodiments, the terminals may be configured to transmit over the shared medium, and the hub may be configured to receive the transmissions from the terminals over the shared medium, in accordance with a (continuous transmission) waveform such as, but not limited to, DVB-S2 (ETSI EN 302 307) or DVB-S2X. According to any of these waveforms, data may be encapsulated into frames (also known in the DVB-S2/DVB-S2X standards as Baseband Frames (BBF)), wherein different frames may be encoded and modulated using different forward-error-correction-coding (FEC) and modulation combinations (MODCOD).

FIG. 2 shows a block diagram of receiver 200, comprising a demodulator 210, channel profiles storage 220 and controller 230. In some embodiments, the hub may comprise one or more receivers such as receiver 200.

Demodulator 210 may be configured to receive an intermediate frequency (IF) signal 201, the IF signal comprising a transmission signal of interest corresponding to a channel profile (e.g. a symbol rate, frequency, and/or additional attributes). Demodulator 210 may be configured to demodulate and decode the transmission signal of interest in accordance with the applicable waveform (e.g., DVB-S2X), and output the demodulated and decoded frames 202 (e.g., BBFs), that may contain encapsulated data, e.g. to be processed by another element of the receiver or of the hub.

Demodulator 210 may be configured to support fast relocking on the transmission signal of interest, e.g. after lock on the transmission signal of interest is lost (e.g., for less than a predefined duration). For example, lock on the transmission signal may be lost due to a cessation in transmitting the transmission signal of interest (e.g. as further described herein), or due to an undesired pause in receiving the transmission signal of interest (e.g. due to a drop in reception level). Demodulator 210 may be configured to support fast relocking on the transmission signal of interest also after receiving a command to relock on the transmission signal of interest (e.g., as further described herein). In some embodiments, demodulator 210 may be configured to relock on the transmission signal of interest sufficiently fast (e.g., within a sufficiently short time), so that not even a single frame may be lost. In some embodiments, demodulator 210 may be configured to support beam hopping, e.g., if used in a FWD link receiver of a terminal.

In some embodiments, demodulator 210 may be configured to receive a relock signal 231, and attempt to relock (or lock) on a transmission signal of interest corresponding to the most recently received channel profile in response to receiving the relock signal. In some embodiments, demodulator 210 may be configured to extract, in accordance with the applicable waveform, an in-band signal 232 that may be inserted by the transmitter of the transmission signal of interest (e.g. a terminal of the plurality of terminals) into the transmission signal of interest. The in-band signal may be used by controller 230, e.g., as further described herein.

Channel profiles storage 220 may be configured to store at least two channel profiles, wherein the at least two channel profiles may comprise a current channel profile and at least one additional (next) channel profile. Any of the stored channel profiles may comprise attributes for setting demodulator 210 to demodulate a transmission signal of interest, for example, a symbol rate attribute, a frequency attribute, etc. The channel profiles may be stored 223 in channels profiles storage 220 by the medium manager 280, which may be an element of the hub (e.g., external to receiver 200). Channels profiles storage 220 may be coupled to demodulator 210 for at least the purpose of transferring any of the at least two channel profiles 221 to demodulator 210 in response to receiving a load profile signal 222. In some embodiments, channel profile storage 220 may be configured to store a current channel profile and a next channel profile, and responsive to receiving the load profile signal 222 to transfer the next channel profile to demodulator 210 and switch the roles between the two stored channel profiles. In some embodiments, channel profile storage 220 may be configured to store a current channel profile and two or more additional (next) channel profiles. In such embodiments, the load profile signal 222 may include an indication as to which of the at least two additional (next) channel profiles to transfer.

Controller 230 may be configured to control the operation of receiver 200. Controller 230 may be coupled to channel profiles storage 220 for at least the purpose of providing a load profile signal 222 to channel profiles storage 220 at an appropriate time. Controller 230 may be coupled to demodulator 210 to provide a relock signal 231 to demodulator 210, and to perhaps receive an in-band trigger signal 232 that demodulator 210 may be configured to extract from the transmission signal of interest. Furthermore, controller 230 may be configured to receive a trigger for relocking demodulator 210 from two sources. The first source may be a synchronization element 290, which may be an element of the hub (e.g., external to receiver 200). Synchronization element 290 may be configured to provide a trigger 233 to receiver 200 (in particular, controller 230), for example at a time or a short interval prior to a time when receiver 200 may be required to relock on a transmission signal of interest or acquire (lock on) a new transmission signal of interest. This trigger 233 may be provided using any of hardware, software, or any other means or combinations thereof. The second source may be an in-band trigger 232, which may be included in an in-band signal, that controller 230 may be configured to receive from demodulator 210. In some embodiments, the in-band trigger may indicate a number of additional frames (e.g. BBFs) to be received before sending a relock signal to demodulator 210 is due, wherein the indicated number may be zero (e.g., triggering an immediate relock) or higher (e.g., triggering a relock after receiving the indicated number of additional frames).

In accordance with aspects of the disclosure, a satellite communication system comprising a hub and a plurality of terminals may be presented. The hub of the satellite communication system may comprise a medium manager 280 configured to manage a shared medium (at least one return link (RL) channel) that may be shared by terminals of the plurality of terminals. The hub may also comprise at least one receiver configured to receive transmissions over the at least one RL channel (e.g. transmission signals of interest). Furthermore, the transmissions over the at least one RL channel may be associated with a waveform designed for continuous transmissions, yet the RL channel may be shared by multiple terminals of the plurality of terminals. In some embodiments, the at least one receiver may be in accordance with the previously described receiver 200. In some embodiments, the waveform designed for continuous transmissions may be the DVB-S2 waveform or the DVB-S2X waveform.

The shared medium manager 280 may be configured to assign the at least one RL channel to the multiple terminals in turns. The shared medium manager may determine (e.g., using any applicable quality-of-service algorithm and/or resource allocation algorithm) for each terminal of the multiple terminals a number of consecutive frames (e.g. BBFs) the terminal may be allowed to transmit in a single transmission, wherein so determining may also determine times at which transmission may be switched between terminals of the multiple terminals. Each terminal of the multiple terminals may be assigned the transmission periods determined by the shared medium manager and transmit the determined number of frames in accordance with the transmission periods assigned to it. The transmissions of the multiple terminals may be synchronized, not to overlap each other at the input of the receiver at the hub.

For example, and in reference to FIG. 3, Terminal 1, Terminal 2 and terminal n may be assigned the at least one RL channel in turns. Transmission 321 of Terminal 2 may begin before transmission 311 of Terminal 1 ends, and transmission 331 of Terminal n may start (immediately or a while) after transmission 321 of Terminal 2 ends. However, as the terminals may be synchronized (e.g. in reference to the receiver), transmissions 311, 321 and 331 may arrive at the at least one receiver as transmissions 311R, 321R and 331R, respectively, e.g., forming a (nearly) continuous transmission with no overlaps.

At the hub, the receiver (e.g. receiver 200) may be set (e.g., by the shared medium manager) using a single channel profile, e.g., to continuously receive a transmission over the at least one RL channel. The hub and the multiple terminals may be synchronized, wherein the synchronization may account for the shared medium latency (e.g. a time it may take a transmission to travel over the shared medium from a transmitting terminal to the at least one receiver, wherein this time may be different for each terminal, e.g., as suggested in FIG. 3). With the multiple terminals being synchronized with the at least one receiver (of the hub), the at least one receiver may be triggered to relock whenever a received transmission of one terminal, of the multiple terminals, ends and a received transmission of another terminal, of the multiple terminals, starts (e.g., triggers 341, 342, 343, etc.). The at least one receiver may be configured, responsive to receiving a trigger to relock, to quickly relock (e.g., in nearly zero time) on the transmission of the other terminal of the multiple terminals without losing any frame transmitted by either the one terminal or the other terminal.

In some embodiments, the hub may further comprise a synchronization element 290 configured to at least provide triggers to the at least one receiver. The synchronization element 290 may be coupled to the shared medium manager 280 and configured to generate triggers (e.g., triggers 341, 342, 343, etc.) in accordance with the times determined by the shared medium manager for switching the transmission over the RL channel between terminals of the multiple terminals. The synchronization element may be configured to provide triggers to the at least one receiver using any of hardware, software, or any other means or combinations thereof.

In some embodiments, a demodulator 210 included in the at least one receiver 200 may be configured to extract, in accordance with the applicable waveform, an in-band signal that may be inserted by a transmitting terminal of the multiple terminals into the transmission (e.g., by any of Terminals 1 to n, into any of their respective transmissions 311 to 332). The at least one receiver may be configured to trigger itself (e.g. the demodulator 210) to relock on the received transmission in accordance with the in-band signal (e.g. by generating any of triggers 342 to 347). In some embodiments, the in-band signal may indicate a number of additional frames (e.g. BBFs) yet to be transmitted and/or received before the transmission by the transmitting terminal ends. The indicated number of frames may be zero (e.g., to cause immediate relock triggering once receiving a current frame may be completed) or higher (e.g., to trigger a relock after the indicated number of additional frames may be received).

In accordance with aspects of the disclosure, a satellite communication system comprising a hub and a plurality of terminals is presented. The hub of the satellite communication system may comprise a shared medium manager 280 configured to manage at least one return link (RL) channel, and at least one receiver configured to receive transmissions over the at least one RL channel in accordance with a waveform designed for continuous transmissions. In some embodiments, the at least one receiver may be in accordance with the previously described receiver 200, and/or the waveform designed for continuous transmissions may be any of the DVB-S2 waveform, the DVB-S2X waveform, and any other continuous transmission waveform. The shared medium manager may be configured to assign the at least one RL channel to a terminal of the plurality of terminals, and from time-to-time modify the at least one RL channel while the at least one RL channel may be assigned to the terminal. In some embodiments, modifying the at least one RL channel may comprise modifying any of a frequency attribute of the at least one RL channel, a bandwidth of the at least one RL channel, etc. In some embodiments, modifying the at least one RL channel may comprise determining a (future) time for modifying the at least one RL channel, storing a next channel profile 223 corresponding to the modified attributes in the channel profiles storage 220 of the at least one receiver 200, and sending a notification to the terminal. The notification sent to the terminal may comprise at least the modified attributes and a time corresponding to the determined time for modifying the at least one RL channel. The hub may be configured to modify the at least one RL channel in accordance with the sent notification at about the determined time. The at least one receiver 200 may be triggered to initiate (e.g., by load profile signal 222) loading of the next channel profile 221 from the channels profiles storage 220 to the receiver's demodulator 210, and then to command the demodulator to relock (e.g., using relock signal 231) on the transmission over the at least one RL channel in accordance with the loaded next channel profile. The at least one receiver 200 may be triggered either by a synchronization element 290 of the hub, or based on an in-band trigger 232 that may be provided by the terminal transmitting over the at least one RL channel.

The terminal may be configured to receive, from the hub and while transmitting over the at least one RL channel, at least one notification comprising one or more attributes of the at least one RL channel and a time at which the at least one RL channel may be modified in accordance with the one or more attributes. The terminal may be configured, responsive to receiving the at least one notification, to determine a number of frames that may be transmitted until the notified time arrives. In some embodiments, the terminal may be configured to signal the determined number of frames within its transmission, for example, in order to generate an in-band trigger in the at least one receiver. The terminal may be configured to determine that the determined number of frames were transmitted, and if so, to stop transmitting over the at least one RL channel. The terminal may be further configured, after it stops transmitting, to modify one or more attributes of its transmission (e.g. frequency, symbol rate, etc.) in accordance with the one or more attributes included in the received notification, and resume transmission over the at least one RL channel in accordance with the modified transmission attributes.

The terminal and the at least one receiver may be synchronized, wherein the synchronization may account for the shared medium latency. With the terminal being synchronized with the at least one receiver (of the hub), the at least one receiver may be triggered to relock as the received transmission of the terminal ends, so that not even a single transmitted frame may be lost. The at least one receiver may be configured, responsive to receiving the trigger, to quickly relock on the transmission of the terminal once the transmission may be resumed in accordance with the modified attributes. However, compared to relocking using the same transmission attributes (channel profile), as previously mentioned, it may take the at least one receiver a bit longer to relock with the attributes of the resumed transmission differing from the attributes of the previous transmission, resulting in a possible loss of one or more frames of the resumed transmission.

In accordance with aspects of the disclosure, a terminal of a satellite communication system may comprise a receiver 200, wherein the terminal may be configured to communicate (e.g. with a hub of the satellite communication system) via a satellite that may be configured to operate using a beam hopping technique. In some embodiments, the receiver 200 may be used as a forward link (FL) receiver of the terminal. The FL receiver may be set (e.g., by the terminal's processor and/or software) using a single channel profile, e.g., to continuously receive a forward link transmission that may be transmitted by a hub of the satellite communication system. As the satellite may operate using a beam hopping technique, reception of the FL transmission (e.g. by the FL receiver of the terminal) may be interrupted when the satellite switches a feeder beam including the FL transmission to a user beam not covering the terminal. The FL receiver may be configured to relock quickly on the FL transmission when the FL transmission may be received again, i.e. when the satellite connects the feeder beam including the FL transmission to the user beam covering the terminal. In some embodiments, the terminal may be configured to determine that the FL receiver lost lock on the FL transmission (e.g. due to the satellite's beam hopping), to determine a (future) time at which the FL transmission may be received again, and to trigger the FL receiver to relock on the FL transmission when the determined time arrives.

In accordance with aspects of the disclosure, the receiver 200 may be used on board of a (regenerative) satellite, wherein the satellite may be configured to operate using a beam hopping technique. The satellite may comprise multiple receivers in accordance with receiver 200. One or more receivers of the multiple receivers may be used for receiving one or more corresponding continuous transmissions, that may be associated with one or more waveforms designed for continuous transmissions (e.g. DVB-S2X), via at least one feeder beam of the satellite. Additional one or more receivers of the multiple receivers may be used for receiving one or more corresponding transmissions via multiple user beams associated with the at least one feeder beam. In some embodiments, the one or more corresponding transmissions received via the multiple user beams may be associated with one or more waveforms designed for continuous transmissions (e.g. DVB-S2X). Due to the beam hopping technique used by the satellite and/or the dynamic nature of transmissions that may be received via the multiple user beams, the one or more corresponding transmissions may be interrupted. Such interruptions may occur, for example, when the satellite connects the at least one feeder beam to another user beam of the multiple user beams, when transmission over a channel included in a user beam switches between transmitting terminals, or when characteristics of a transmission (e.g. symbol rate, frequency, etc.) included in a user beam are modified. Upon any such interruption, any receiver of the additional one or more receivers may relock quickly on the transmission it may be programmed to receive when the transmission may be received again. For at least that purpose, any of the additional one or more receivers may be operated in accordance with any of the previously described operation modes of receiver 200, or in any mode that may be a combination of the modes previously described.

It may be noted that receiver 200 may be used for both communication directions via the satellite, i.e. either as a continuous transmission receiver, or as an intermittent transmission receiver. This characteristic of receiver 200 may be utilized, for example, to simplify a design and/or an implementation of the satellite (e.g., common redundancy), as well as for supporting dynamic shifting of receivers between the at least one feeder beam and the multiple user beams, e.g., in accordance with real-time needs. Such dynamic shifting of receivers between the at least one feeder beam and the multiple user beams may be useful also in cases of reconfiguring the satellite for different traffic patterns and in cases were resources may need to be redistributed to overcome failures (e.g. as the satellite ages).

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. For example, the controller 230 may include a microcontroller, a processor (e.g., microprocessor) operating computer-readable instructions, an application specific integrated circuit (ASIC), a field programmable gate array, or any combination thereof. As another example, the demodulator 210 may include logic (e.g., logic gates, such as AND gates), an ASIC, a field programmable gate array, a processor, or any combination thereof. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

We claim:

1. A receiver, comprising:
   a demodulator configured to receive a first transmission comprising a sequence of frames, and to lock on a second transmission in response to receiving a relock signal, wherein the first transmission is received over a return link channel from a first terminal and the second transmission is received over the return link channel from a second terminal;
   a storage configured to store a plurality of channel profiles and to transfer any of the plurality of channel profiles to the demodulator in response to receiving a load profile signal; and
   a controller configured to provide the load profile signal to the storage and provide, responsive to receiving a trigger, the relock signal to the demodulator.

2. The receiver of claim 1, wherein the demodulator is configured to lock on the second transmission without losing any frame of the sequence of frames.

3. The receiver of claim 1, wherein the demodulator is configured to lock on the second transmission in accordance with a last channel profile provided to the demodulator.

4. The receiver of claim 1, wherein the demodulator is configured to:
   prior to locking on the second transmission, extract an in-band signal from the first transmission, wherein the in-band signal comprises a number of additional frames to be received before the demodulator relocks.

5. The receiver of claim 1, wherein each of the plurality of channel profiles comprises a symbol rate attribute or a frequency attribute.

6. The receiver of claim 1, wherein the storage is further configured to, responsive to receiving the load profile signal:
   transfer a next channel profile to the demodulator; and
   switch roles between a current channel profile and the next channel profile.

7. The receiver of claim 1, wherein the trigger comprises one of an external trigger or an in-band trigger, and wherein the controller is further configured to:
   receive, from a source external to the receiver, the external trigger at a time prior to a time the receiver locks on the second transmission; and
   receive, from the demodulator, the in-band trigger in response to receiving a specified number of additional frames.

8. The receiver of claim 1, wherein the first transmission is in accordance with a Digital Video Broadcasting-Satellite-Second Generation (DVB-S2) waveform or a Digital Video Broadcasting-Satellite-Second Generation Extensions (DVB-S2X) waveform.

9. A satellite communication system comprising a plurality of terminals and a hub, wherein the hub comprises:
   a shared medium manager configured to assign a return link (RL) channel to multiple terminals of the plurality of terminals; and
   a receiver configured to receive a transmission over the RL channel, wherein the receiver comprises:
      a demodulator configured to receive the transmission comprising a sequence of frames, and to relock on the transmission in response to receiving a relock signal to relock on the transmission;
      a storage configured to store a plurality of channel profiles and to transfer any of the plurality of channel profiles to the demodulator in response to receiving a load profile signal; and
      a controller configured to provide the load profile signal to the storage and provide, responsive to receiving a trigger, the relock signal to the demodulator.

10. The satellite communication system of claim 9, wherein the shared medium manager is configured to assign the RL channel to the multiple terminals in turns by:
    determining, for each terminal of the multiple terminals a number of consecutive frames the terminal is allowed to transmit in a single transmission;
    determining, in accordance with the determined number of consecutive frames for each terminal of the multiple terminals, transmission periods for the multiple terminals to transmit data over the RL channel;
    assigning, to each of the multiple terminals, one of the transmission periods; and
    setting, using a single channel profile, the receiver to receive transmissions over the RL channel.

11. The satellite communication system of claim 9, wherein the hub and the multiple terminals are synchronized so that transmissions from different terminals of the multiple terminals do not overlap at an input of the receiver.

12. The satellite communication system of claim 11, wherein the synchronization comprises accounting for times it takes data to travel over a shared medium from each of the multiple terminals to the receiver.

13. The satellite communication system of claim 9, wherein:
    the receiver is triggered to relock whenever a first transmission of one terminal of the multiple terminals ends and a second transmission of another terminal of the multiple terminals starts; and the receiver is configured to relock on the second transmission without losing any frame of the first transmission and any frame of the second transmission.

14. The satellite communication system of claim 9, further comprising a synchronization element coupled to the shared medium manager and to the receiver and configured to provide triggers to the receiver in accordance with transmission periods determined by the shared medium manager and assigned to the multiple terminals.

15. The satellite communication system of claim 9, wherein the transmission is in accordance with a Digital Video Broadcasting-Satellite-Second-Second Generation (DVB-S2) waveform or A Digital Video Broadcasting-Satellite-Second Generate Extensions (DVB-S2X) waveform.

16. The satellite communication system of claim 9, wherein the shared medium manager is configured to modify the RL channel while the RL channel is assigned to a terminal of the plurality of terminals.

17. The satellite communication system of claim 16, wherein modification of the RL channel comprises:

determining a time for modifying a frequency attribute of the RL channel or a bandwidth of the RL channel;

storing, in the storage, a next channel profile corresponding to a modified frequency attribute or modified bandwidth; and sending, to the terminal, a notification comprising the modified frequency attribute or the modified bandwidth and a time corresponding to the determined time for modifying the RL channel.

18. The satellite communication system of claim 17, wherein the modification of the RL channel further comprises:

triggering the receiver to load the next channel profile to its demodulator; and triggering the receiver to relock on a next transmission in accordance with the next channel profile at about the determined time.

19. A method, comprising:

receiving, by a demodulator of a receiver, a first transmission over a return link channel from a first terminal;

storing, by a storage of the receiver, a plurality of channel profiles;

providing, by a controller of the receiver, a load profile signal to the storage;

responsive to receiving a trigger, providing, by the controller of the receiver, a relock signal to the demodulator;

transferring, by the storage, a channel profile of the plurality of channel profiles to the demodulator in response to receiving the load profile signal; and locking, by the demodulator in response to the relock signal, on a second transmission that is received over the return link channel from a second terminal.

20. The method of claim 19, further comprising:

extracting the trigger from the first transmission.

* * * * *